United States Patent
Faggion et al.

(10) Patent No.: US 10,526,735 B2
(45) Date of Patent: Jan. 7, 2020

(54) SUBSTRATE FOR A SUPPORT FOR BITUMINOUS MEMBRANE AND METHOD FOR THE PREPARATION THEREOF

(71) Applicant: POLITEX s.a.s. di FREUDENBERG POLITEX s.r.l., Milan (IT)

(72) Inventors: Gilberto Faggion, Castelfranco Veneto (IT); Gerardo Salvatore Menna, San Gennaro Vesuviano (IT)

(73) Assignee: POLITEX S.A.S. DI FREUDENBERG POLITEX S.R.L., Milan (IT)

( * ) Notice: Subject to any disclaimer, the term of this patent is extended or adjusted under 35 U.S.C. 154(b) by 158 days.

(21) Appl. No.: 14/898,835

(22) PCT Filed: Jul. 2, 2014

(86) PCT No.: PCT/EP2014/064091
§ 371 (c)(1),
(2) Date: Dec. 16, 2015

(87) PCT Pub. No.: WO2015/000975
PCT Pub. Date: Jan. 8, 2015

(65) Prior Publication Data
US 2016/0122923 A1 May 5, 2016

(30) Foreign Application Priority Data

Jul. 3, 2013 (IT) .............................. MI2013A1114

(51) Int. Cl.
*B32B 5/26* (2006.01)
*D04H 1/492* (2012.01)
(Continued)

(52) U.S. Cl.
CPC ............. *D04H 1/492* (2013.01); *B32B 5/26* (2013.01); *D04H 1/4209* (2013.01);
(Continued)

(58) Field of Classification Search
CPC ... Y10T 442/3715; Y10T 442/643–645; Y10T 442/159; Y10T 442/16;
(Continued)

(56) References Cited

U.S. PATENT DOCUMENTS 3,154,462 A * 10/1964 Smith, II ................. D04H 5/02
442/102
5,047,276 A    9/1991 Chomarat et al.
(Continued)

FOREIGN PATENT DOCUMENTS

EP    0 315 553    5/1989
EP    1 577 436    9/2005
(Continued)

OTHER PUBLICATIONS

International Search Report and Written opinion dated Sep. 30, 2014 in International (PCT) Application No. PCT/EP2014/064091.

*Primary Examiner* — Z. Jim Yang
(74) *Attorney, Agent, or Firm* — Wenderoth, Lind & Ponack, L.L.P.

(57) ABSTRACT

A substrate for a support for bituminous membranes, comprising two or more layers of fibers comprising a homogeneous mixture of organic fibers and inorganic fibers, between which there is interposed a reinforcing scrim, said fibers being oriented parallel to the longitudinal axis of the substrate and laid said by side and alternate.

19 Claims, 1 Drawing Sheet

(51) Int. Cl.
*D04H 1/4209* (2012.01)
*D04H 1/559* (2012.01)
*E04D 5/02* (2006.01)
*E04B 1/62* (2006.01)
*E04D 3/35* (2006.01)
*D06N 5/00* (2006.01)
*E04D 12/00* (2006.01)

(52) U.S. Cl.
CPC .............. *D04H 1/559* (2013.01); *D06N 5/00* (2013.01); *E04B 1/625* (2013.01); *E04D 3/35* (2013.01); *E04D 5/02* (2013.01); *E04D 12/002* (2013.01); *B32B 2419/06* (2013.01); *Y10T 442/16* (2015.04); *Y10T 442/643* (2015.04)

(58) Field of Classification Search
CPC ... Y10T 442/197; B32B 2419/06; B32B 5/22; B32B 5/24; B32B 5/26; B32B 5/28; D06N 5/00–006; E04D 12/002; E04B 1/625; D04H 1/4326–4366; D04H 3/005–011
See application file for complete search history.

(56) References Cited

U.S. PATENT DOCUMENTS

| | | | | |
|---|---|---|---|---|
| 6,110,572 | A * | 8/2000 | Groh | D04H 3/04 428/219 |
| 6,235,657 | B1 * | 5/2001 | Schops | B32B 5/26 442/57 |
| 6,503,853 | B1 * | 1/2003 | Kassner | E01C 11/165 428/102 |
| 6,808,796 | B1 * | 10/2004 | Miyao | B29C 70/202 428/113 |
| 2004/0185734 | A1 * | 9/2004 | Gray | B29C 70/22 442/312 |
| 2004/0214489 | A1 * | 10/2004 | Porter | B32B 5/26 442/36 |
| 2004/0229534 | A1 * | 11/2004 | Peruzzo | B32B 5/08 442/36 |
| 2005/0124250 | A1 * | 6/2005 | Wilson | B32B 5/08 442/327 |
| 2005/0148250 | A1 * | 7/2005 | O'Connor | B32B 5/26 442/2 |
| 2005/0208852 | A1 | 9/2005 | Weber | |
| 2005/0227565 | A1 * | 10/2005 | Peruzzo | B32B 5/08 442/392 |
| 2005/0250399 | A1 * | 11/2005 | Kuhn | B32B 5/26 442/48 |
| 2006/0111000 | A1 * | 5/2006 | Bascom | A47C 31/001 442/136 |
| 2006/0166582 | A1 * | 7/2006 | Turkson | B32B 5/024 442/270 |
| 2006/0172638 | A1 * | 8/2006 | Chabal | B32B 5/022 442/36 |
| 2006/0228963 | A1 * | 10/2006 | Souther | B32B 5/022 442/86 |
| 2007/0077838 | A1 * | 4/2007 | Binkley | B32B 5/26 442/286 |
| 2007/0099524 | A1 * | 5/2007 | Porter | B32B 5/24 442/38 |
| 2007/0281562 | A1 * | 12/2007 | Kohlman | B32B 5/04 442/32 |
| 2008/0026663 | A1 * | 1/2008 | Zhang | B32B 11/04 442/398 |
| 2008/0108741 | A1 * | 5/2008 | Van Herwijnen | C03C 25/26 524/443 |
| 2009/0048371 | A1 | 2/2009 | Weber | |
| 2011/0244204 | A1 * | 10/2011 | Migliavacca | B32B 5/26 428/219 |
| 2012/0149264 | A1 * | 6/2012 | Porter | B32B 5/028 442/35 |
| 2015/0140306 | A1 * | 5/2015 | Endo | D04H 1/4218 428/219 |

FOREIGN PATENT DOCUMENTS

| | | | | |
|---|---|---|---|---|
| GB | | 1073181 | 6/1967 | |
| GB | | 1 310 691 | 3/1973 | |
| WO | WO-2006080907 A1 * | | 8/2006 | ............... A41D 3/00 |

* cited by examiner

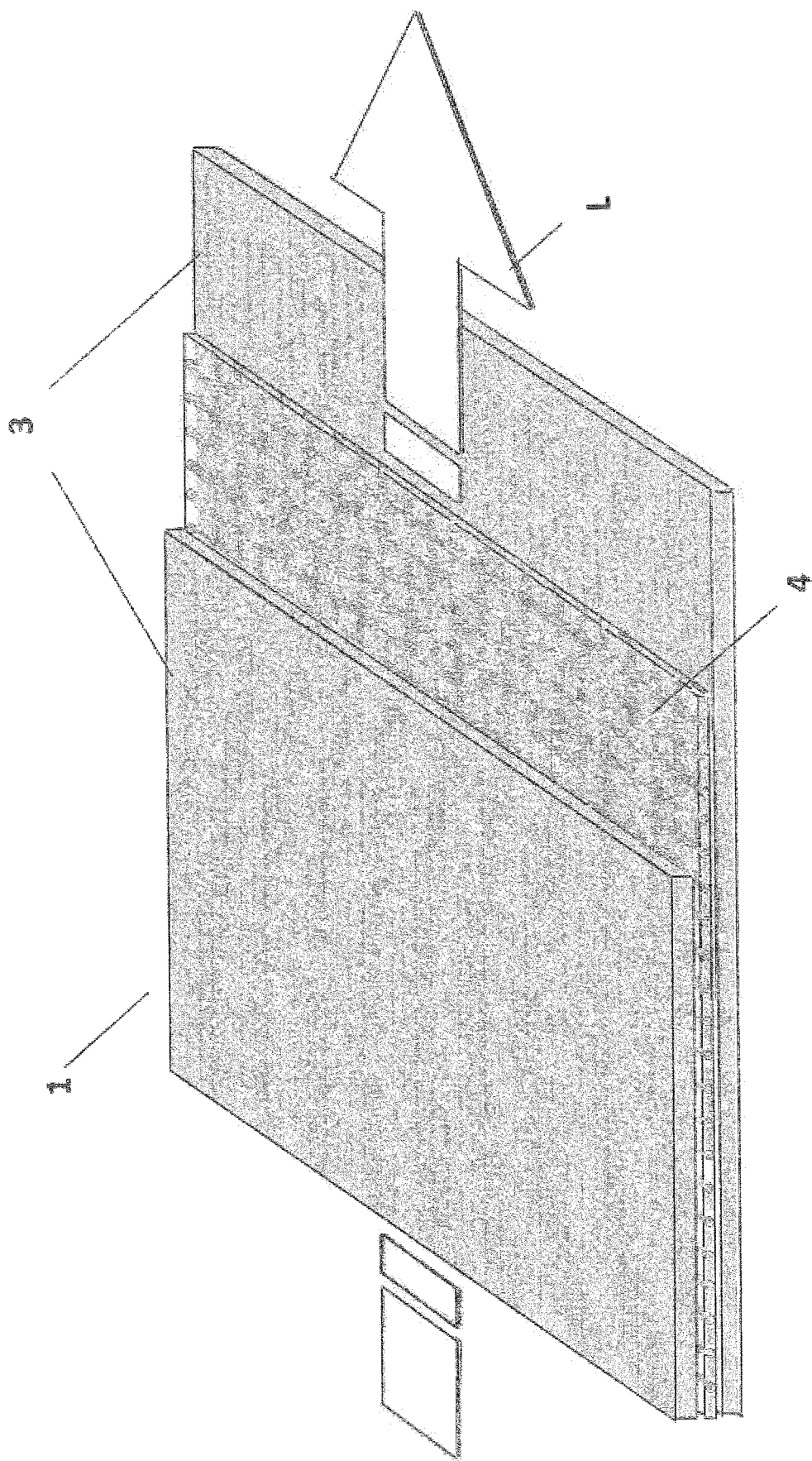

SUBSTRATE FOR A SUPPORT FOR BITUMINOUS MEMBRANE AND METHOD FOR THE PREPARATION THEREOF

The present invention relates to a substrate for a support for bituminous membrane and a method for the preparation thereof.

Substrates for supporting bituminous membranes used to make roofs waterproof have to meet several technical requirements, but above all must meet ever increasing requirements of performance improvements.

In particular, an increasing dimensional stability is required with respect to mechanical and thermal stresses which characterize the bitumen impregnation step, but also the lifespan after laying the finished membranes on roofs.

In order to increase the resistance to mechanical stresses and therefore improve the dimensional stability of the supports and the membranes produced therefrom, the use of reinforcement members, such as threads, scrims, non-woven fabric layers, made in mineral fibres, mainly high-resistance glass, synthetic or artificial fibres.

Furthermore, for economic reasons, the market pushes for a production of fabrics with increasingly lower unit weights.

Besides the requirements of rigidity and stability against mechanical and thermal stresses mentioned above, the supports for bituminous membranes must meet the parameters defined by the technical specifications and in particular the limits defined for the value of the ultimate tensile strength in both a longitudinal and transversal direction.

The latter is, in most cases, critical to comply with, often requiring to increase the mass of the non-woven fabric with respect to that strictly required to meet the performance features of processability and those of the specification relating to the longitudinal direction only.

Furthermore, in the case of products manufactured from staple, the compliance with the mechanical features in the transversal direction imposes particularly expensive technological choices, such as carding machines arranged in the transversal direction, card web devices and pre-needling machines to consolidate the layers made of fibers oriented in the direction orthogonal to that of production.

Finally, the safety regulations regarding fire resistance of building materials, approved or pending approval in the various industrialized countries impose to manufacturers the use of materials which allow to comply with the regulation restrictions.

In the literature, there are numerous examples of supports manufactured with one or more layers of synthetic fibers reinforced with longitudinal reinforcing threads of by a layer made of a scrim or by a non-woven fabric of glass fibers.

US-2010/0119795 teaches how to overlap a layer made of a non-woven fabric of glass fibers to a layer consisting of organic fibers, and to connect the two layers by means of mechanical or water jet needling.

U.S. Pat. Nos. 5,118,550, 4,539,254, 6,131,351 and EP-0806509 teach the use of glass threads, mineral fibers, synthetic fibers, metal threads, having high Young's modulus arranged longitudinally to reinforce one or more layers of non-woven fabric of organic fibers, used as supports for bituminous sheaths.

EP-0285533 teaches how to produce supports for bituminous membranes, made of one or more layers of organic fibers, a glass thread scrim, the layers being consolidated by means of a hydroentangling process.

EP-0907781, by resuming the teaching of the previous patent, teaches how to form at least one of the layers of organic fibers adding an amount of 20-40% by weight of fibers having high resistance to fire and heat (aramid fibers).

EP-0668392 teaches how to use a scrim of glass threads coupled to a non-woven fabric of polyester staple fibers, connected by tricot processes (Malimo).

FR-2804677 teaches how to improve the tear strength of supports for membranes made of non-woven glass fabrics.

These are made by wet processing, starting from water dispersions of glass fibers cut with a length of a few millimetres.

FR-2804677 teaches how to mix, to glass fibers in the aqueous dispersion, polyester fibers having low length, in a proportion of about 25%. Then the dispersion is usually distributed on a suction mat to form the fibrous layer, consolidated with formaldehyde-based resins and dried.

The substrates produced according to the teachings of FR 2804677, however, have a series of important disadvantages. The wet process forces to use fibers having a very low length. Therefore, the mechanical strength of these substrates is very low both for the limited number of points of fiber-fiber adhesion, due to the limited length of the fibers, and for the lack of any action of mechanical consolidation (conventional or water-jet needling).

EP-1577436 describes a mix for the production of bituminous membranes consisting of organic and inorganic fibers.

An object of the present invention is to provide a substrate for a support for bituminous membranes extremely lighter with respect to those available on the market and therefore with better weight-to-performance ratio.

A further object of the present invention is to manufacture a substrate for a support provided with high mechanical strength, great dimensional stability and good flame-retardant features.

In accordance with the invention such objects are achieved by means of a substrate for a support for bituminous membranes as described in claim 1.

Yet a further object of the present invention is to provide a method for obtaining said substrate.

Said yet further object is achieved by a method for producing a substrate for a support for bituminous membranes, characterized in that it provides the mixing of organic fibers and inorganic fibers obtained through repeated opening and blending operations during the fiber preparation to the carding step, the combination of two or more fiber layers obtained with said mixing of dry-processed products by means of a card, the interposition between said layers of a reinforcing scrim, the consolidation of the substrate by means of high pressure water jets (hydroentangling), the drying and heat setting.

The features of the present invention will appear more clearly from the following detailed description of some exemplary embodiments thereof, illustrated by means of non-limiting examples with reference to the appended FIG. 1, which shows a perspective cutaway view of a substrate according to the present invention.

A substrate 1 for a support for bituminous membranes comprises two or more layers of fibers 3 made by dry-processing by means of a card, inside which there is interposed a reinforcing scrim 4; the layers-scrim 3, 4 complex is then consolidated by means of hydroentangling, dried, thermally stabilized and may be further consolidated by the application of a binder.

The fiber 3 comprises organic staple fibers and inorganic staple fibers, appropriately mixed.

The thorough mixing of said fibers takes place by repeated opening and blending operations in the step of preparation to carding. Consequently, by the carding step, it is obtained that the fibers 3 are arranged parallel to the longitudinal axis L of the substrate 1 and that the organic fibers and the inorganic fibers are alternate and laid side by side to constitute a homogeneous mixture.

Said orientation, parallel and alternate, of fibers improves the dimensional stability of the product, and together with the calibrated selection of the type and structure of the support scrim 4 allows obtaining the desired performance in terms of mechanical strength both in the longitudinal L (that of fibers) and transversal direction, reducing the use of fibers.

It is important for the distribution of the organic fibers and the inorganic fibers in the surface unit of the substrate 1 to be as homogeneous as possible and corresponding to the desired and ideal proportion. In particular, the percentage by weight of inorganic fibers contained in the surface unit of the substrate 1 has to be not lower than 90% of the set average value and not greater than 110% of the same value.

The above concept and the verification method is better illustrated in the experimental example three below.

The organic fiber may be produced from various spinnable polymers. Suitable polymers are, for example, polyamides, both aromatic (e.g. aramid) and aliphatic (e.g. nylon), both aromatic and aliphatic polyesters, polymers with ether or ketone groups (e.g. PEK and PEEK).

Preferably the organic fibers are produced from polyethylene-terephthalate (PET).

The polymer used to produce the organic fibers may be both virgin and partially or totally retrieved from recycled materials.

PET fibres generally have a denier comprised between 1.1 dtex and 17 dtex, preferably between 2.8 dtex and 6.7 dtex.

The cutting length is generally comprised between 38 and 120 mm, preferably between 50 and 100 mm.

The inorganic fibers preferably consist of glass staple fibers.

The glass staple fiber, E or C type, generally has a denier comprised between 1.1 dtex and 6.7 dtex, preferably between 1.7 dtex and 4.4 dtex, and a cutting length comprised between 25 and 80 mm, preferably between 30 and 50 mm. A variable cutting length is also acceptable.

The inorganic fibers comprise glass fibers, carbon fibers, ceramic or metal fibers.

The fibers 3 constituting the layers of the present invention may have a circular section or even of a different shape, such as a triangular and/or three-lobe, dumbbell or multi-lobe shape.

In the present invention, the best results are achieved when the organic fibers described above constitute a proportion between 50 and 90% by weight of the mixture, preferably between 60 and 80% by weight, the remainder being made of glass staple fibers.

The above-mentioned proportion is a critical factor, calibrated to obtain dimensional stability and good flame-retardant properties of the product, provided by the inorganic fibers, optimizing at the same time the mechanical features deriving from the organic component.

Experimentally, it has been noted that the organic component may not be lower than 50% for reasons of minimal mechanical strength, while it may not go over 90% because the inorganic component would be too low, thus jeopardizing the dimensional stability and the fire-resistance performance.

Furthermore, by reducing the organic component, the mechanical features of the product deteriorate (elasticity, toughness, breaking strength and tear strength), which suggests that a proportion of organic components not lower than 60% should be used.

Likewise, a proportion of inorganic component greater than 20% (organic component lower than 80%) provides great dimensional stability and fire resistance.

With the fibers 3 described above, two or more films are formed through a drum carding machine; the reinforcing scrim 4 is interposed between the films.

The use of reinforcing scrims 4 allows a simpler predictability of the reinforcing effect and, consequently, an easier selection of the type and structure of the reinforcing member.

The reinforcing scrim 4 is generally made of glass threads, in the majority of cases intermeshed at a right angle, to form a square or rectangular mesh. In order to meet particular needs, it is also possible to use three-direction scrims, which have an isosceles right triangle mesh.

The reinforcing scrims 4 may be made from glass threads with an overall denier comprised between 34 tex and 600 tex, preferably between 34 and 68 tex.

In the case of hybrid scrims 4, the polyester threads have an overall denier comprised between 7 tex and 110 tex, preferably between 18 and 110 tex.

The density of the threads, indicated by the sizes of the mesh, is selected based on the performance to achieve in terms of mechanical strength of the support; generally the scrims 4 are selected with a number of threads per cm in the two directions, comprised between 3×3 and 1×0.5; preferably between 2.5×2.5 and 1.6×0.8.

In some cases, hybrid scrims 4 are used, with longitudinal glass threads and transversal polyester threads and/or alternate in the same direction and/or, in any case, in any combination possible depending on the requirements. The hybrid scrims 4 are generally selected based on the mechanical breaking features which are to be achieved; the most used scrims have breaking strengths, in the two directions, of 160×80 N/50 mm to 700×500 N/50 mm.

The substrate 1 made of two or more fibrous layers 3 with interposed the reinforcing scrim 4 is pre-consolidated by means of a hydroentangling process.

This step is made during the hydroentangling step when the substrate 1 is treated in one or more water jets beams, with a water pressure comprised between 50 and 350 Bar, preferably between 60 and 180 Bar.

The substrate 1 is dried and stabilized by means of thermal treatment at a temperature comprised between 200 and 250° C., preferably between 220 and 240° C. in a hot air (air-through) furnace.

The thermal stabilisation may also take place by means of calendering on rolls heated at a temperature comprised between 190 and 250° C.

Finally, the substrate 1 may be further consolidated by means of the application of a suitable binder, made of acrylic, styrene-acrylic, styrene-butadiene, vinyl resins, etc., optionally mixed with natural origin binders, derived from starches or plant celluloses.

The application of the binder may be achieved by means of a saturation process with an aqueous dispersion of the binder or by application of the binder in the form of a foam.

However, it should be noted that one of the main advantages of the present invention is that of limiting the required amount of binder. In particular, with respect to the proportions of binders used in the prior art, proportions generally comprised between 15 and 30% by weight, with the present invention, the amount of binder needed is reduced to proportions comprised between 5 and 15%, preferably lower than 10%.

The substrate 1 thus obtained has an overall weight per surface unit comprised between 50 and 180 g/m2, preferably between 60 and 130 g/m2.

The present invention allows obtaining several advantages with respect to the prior art.

Firstly, the substrates 1 obtained have a high specific mechanical strength, that is, relative to the unit of weight of the substrate 1, N/5 cm per g/m2, measured from the maximum breaking strength, according to EN 29073-3. This allows reducing the overall weight of the product, at the same time meeting the imposed mechanical specifications, with significant cost savings as regards raw materials.

A significant increase of tear strength is further achieved, a property often crucial in the selection of the mass weight per area unit of the substrate 1.

The presence of mineral fibers intimately mixed in the fibrous layers of the substrate 1, besides the presence of the reinforcing member, allows obtaining very high dimensional stabilities.

For the same reason, that is, the presence of mineral fibers inside the fibrous layers, the substrate 1 is intrinsically provided with high fire-resistance performances. In fact, when performing the fire resistance tests, after the complete combustion of the organic fibers, the presence of glass fibers is found, which form a continuous layer, which prevents the combustible polymer from dropping and thus offers a protection to the underlying construction members.

As already mentioned, a further advantage is the possibility of dramatically reducing the use of binder for the final consolidation of the substrate.

The reduction of the consumptions of raw materials cited hereinbefore is a significant contribution to the reduction of the environmental impact of the products, measurable by an assessment of the lifespan.

In this perspective, furthermore, the reduction of the contents of organic fibers and the consequent increase of the proportion of mineral fibers along with the presence of the reinforcing scrim, provides the substrate 1 with an intrinsic stiffness which facilitates the recyclability of the bituminous membranes produced with such substrates, by means of a grinding and reuse process of bitumen fillers.

Three comparative examples are reported hereinafter.

EXAMPLE 1

A substrate 1 of 106 g/m2 is made by mixing 70% by weight of polyester staple fiber with denier 4.4 dtex, length 76 mm, and 30% of glass staple fiber with denier 5 dtex and length 60 mm. The mixture is obtained by means of a filler, balance and card-opener system which allows achieving a high mixing homogeneity.

The fiber has been pneumatically conveyed to a volumetric feeding system of a longitudinal drum carding machine which, at a speed of 90 m/min, has produced two separate films having the weight of 40 g/m2 each, deposited on two conveyors.

Between the two films there is inserted a glass scrim 4 having a rectangular mesh 1.6×0.8 threads/cm of yarn 68 Tex and the composite, formed by the two films and the scrim interposed, is consolidated in a water jet needling machine, consisting of four hydroentangling units operated at a pressure of 150 Bar.

The substrate 1 is dried and thermally fixed at 230° C. by means of a hot-air calendar and impregnated with a saturation via padding machine with a mixture of resin consisting of 50% styrene butadiene binder, Lutofan DS2380 produced by Basf, and 50% corn dextrin, Stabilys A022 produced by Roquette, dispersed in water with a solid residue of 10%.

The substrate 1 is dried in a forced air-circulation furnace and the resin polymerized at 210° C.

The thus obtained product is compared with the product made according to the prior art as follows.

120 g/m2 substrate made with spunbonded polyester, in two layers consolidated via mechanical needling, with interposed longitudinal reinforcing glass threads, denier 68 tex, placed at a distance of 8 mm.

The composite substrate consolidated via mechanical needling with a density of 40 dots/cm2, thermally stabilized on a hot-air calendar at 230° C. and saturation impregnated with a mixture of resin consisting of 50% styrene butadiene binder, Lutofan DS2380 produced by Basf, and 50% corn dextrin, Stabilys A022 produced by Roquette, dispersed in water with a solid residue of 25%.

The substrate is dried in a forced air-circulation furnace and the resin polymerized at 210° C.

The comparison between the results of the force gauge assays, according to EN 29073-3, is reported in Table 1 below.

TABLE 1

Comparison product 100 g/m2 according to the invention with product spun 120 g/m2 according to the prior art - Example 1

|  |  |  | New product Example 1 100 g/m2 | Prior art Spun reinforced 120 g/m2 |
|---|---|---|---|---|
| Weight per surface unit | MD | g/m2 | 106 | 124 |
|  | CD | g/m2 | 106 | 125 |
| Maximum load | MD | N/5 cm | 315 | 449 |
|  | CD | N/5 cm | 380 | 218 |
| Specific load | MD | daN/5 cm/g/m2 | 0.30 | 0.36 |
|  | CD |  | 0.36 | 0.17 |
|  | TOT |  | 0.66 | 0.54 |
| Elongation at break | MD | % | 15 | 18 |
|  | CD | % | 17 | 22 |
| Isotropy |  |  | 0.83 | 2.06 |

EXAMPLE 2

A substrate 1 of 85 g/m2 is made by mixing 70% by weight of polyester staple fiber, with denier 4.4 dtex and length 76 mm, and 30% of glass staple fiber, with denier 5 dtex and length 60 mm. The mixture is obtained by means of a filler, balance, card-opener and mixer system which allows achieving a high mixing homogeneity.

The fiber is pneumatically conveyed to a volumetric feeding system of a longitudinal drum carding machine which, at a speed of 90 m/min, has produced two separate films of 30 g/m2 each, deposited on two conveyors.

Between the two films there is inserted a glass scrim 4 having a rectangular mesh 1.6×0.8 threads/cm of yarn 34 Tex and the composite, formed by the two films and the scrim interposed, is consolidated in a water jet needling machine, consisting of a wetting unit and 4 hydroentangling units operated at a pressure of 50 to 150 Bar.

The substrate 1 is dried and thermally fixed at 230° C. by means of a hot-air furnace and impregnated by saturation via padding machine with a mixture of resin consisting of 50% styrene butadiene binder, Lutofan DS2380 produced by Basf, and 50% corn dextrin, Stabilys A022 produced by Roquette, dispersed in water with a solid residue of 10%.

The substrate 1 is dried in a forced air-circulation furnace and the resin polymerized at 210° C.

The resulting product is compared with the product made according to the prior art, produced as described hereinafter.

120 g/m2 Substrate made with 100% staple polyester, with denier 4.4 dtex and length 76 mm, in two layers consolidated via needling and with interposed longitudinal reinforcing glass threads, with denier 68 tex, placed at a distance of 8 mm.

The composite substrate, consisting of two layers and with interposed reinforcing glass threads, is consolidated via further mechanical needling with a density of 80 dots/cm2, and impregnated with a saturation via padding machine with a mixture of resin consisting of 50% styrene butadiene binder, Lutofan DS2380 produced by Basf, and 50% corn dextrin, Stabilys A022 produced by Roquette, dispersed in water with a solid residue of 25%.

The substrate is dried in a forced air-circulation furnace and the resin polymerized at 210° C.

The comparison between the results of the force gauge assays is reported in Table 2 below.

TABLE 2

Comparison product 90 g/m2 according to the invention with product staple 120 g/m2 according to the prior art - Example 2

|  |  |  | New product Example 2 90 g/m2 | Prior art Reinforced staple 120 g/m2 |
|---|---|---|---|---|
| Weight per surface unit | MD | g/m2 | 86 | 120 |
|  | CD | g/m2 | 85 | 120 |
| Maximum load | MD | (N/5 cm) | 288 | 296 |
|  | CD | (N/5 cm) | 115 | 178 |
| Specific load | MD | daN/5 cm/g/m2 | 0.33 | 0.25 |
|  | CD |  | 0.14 | 0.15 |
|  | TOT |  | 0.47 | 0.40 |
| Elongation at break | MD | % | 11 | 19 |
|  | CD | % | 19 | 27 |
| Isotropy |  |  | 2.50 | 1.66 |

EXAMPLE 3

A substrate 1 of 140 g/m2 is made by mixing 70% by weight of polyester staple fiber, with denier 4.4 dtex and length 76 mm, and 30% of glass staple fiber, with denier 5 dtex and length 60 mm. The mixture is obtained by means of a filler, balance, card-opener and mixer system which allows achieving a high mixing homogeneity.

The fiber 3 has been pneumatically conveyed to a volumetric feeding system of a longitudinal drum carding machine which, at a speed of 90 m/min, has produced two separate films of 50 g/m2 each, deposited on two conveyors.

Between the two films there is inserted a glass scrim 4 having a rectangular mesh 2×2 threads/cm of yarn 68 Tex and the composite, formed by the two films and the scrim interposed, is consolidated in a water jet needling machine, consisting of a wetting unit and four hydroentangling units operated at a pressure of 50 to 150 Bar.

The substrate 1 is dried and thermally fixed at 230° C. by means of a hot-air furnace and impregnated with a saturation via padding machine with a mixture of resin consisting of 100% corn dextrin, Stabilys D033 produced by Roquette, dispersed in water with a solid residue of 10%.

The substrate 1 is dried in a forced air-circulation furnace and the resin polymerized at 210° C.

The thus obtained product is compared with the product made according to the prior art, produced as described hereinafter.

200 g/m2 substrate made with 100% staple polyester, with denier 4.4 dtex and length 76 mm, in two layers consolidated via needling and with interposed longitudinal reinforcing glass threads, with denier 68 tex, placed at a distance of 8 mm.

The composite substrate, consisting of two layers and with interposed reinforcing glass threads, is consolidated via further mechanical needling with a density of 80 dots/cm2, and impregnated with a saturation via padding machine with a mixture of resin consisting of 70% styrene butadiene binder, Lutofan DS2380 produced by Basf, and 50% corn dextrin, Stabilys A022 produced by Roquette, dispersed in water with a solid residue of 25%.

The substrate is dried in a forced air-circulation furnace and the resin polymerized at 210° C.

The comparison between the results of the force gauge assays is reported in Table 3 below.

The specimens of the substrate of the new product having size 5 cm×30 cm are taken according to Standard EN 29073-3, in the longitudinal direction.

The numbered specimens are weighted with a mg precision balance and the weight is noted down as $P_i$.

The specimens are later treated in a muffle furnace at 450° C. for 30 minutes until complete elimination of the organic part.

The residual ashes, after dryer cooling, are weighted and the value noted down as $P_v$ ($P_v$=weight of glass staple+weight of scrim).

The weight of the fibrous part $P_f$ of the substrate is calculated with the following formula:

$$P_f = 0.9*(P_i - P_r)$$

Where $P_r$ is the weight of the reinforcing scrim contained in the surface of the specimen and 0.9 a reduction coefficient to account for any losses.

The best results are achieved when the distribution of the fibers is homogeneous and the ratio $(P_v - P_r)/P_f$ is comprised, in the case of the example under examination, between 0.27 and 0.33, that is between 90% and 110% of the proportion of glass fibers in the parent mixture (30%).

Table 4 shows the experimental results of the assay.

For each of the specimens:

$P_i$=initial weight of the specimen $P_v$=weight of the glass component $P_r$=weight of the reinforcing scrim $P_f$=weight of the fibrous component (organic fibers+glass fibers)

$(P_v - P_r)/P_f$=ratio between the weight of the component of glass fibers and the weight of the fibrous component $P_f$.

In the result of Example 3, the average of the values of the ratio between the weight of the component of glass fibers and the weight of the fibrous component Pf is 29.2%, very close to the set value of 30%.

Furthermore, the distribution of the values of the ratio under examination is very homogeneous, as indicated by the low value of data dispersion (standard deviation).

TABLE 3

Comparison product 140 g/m2 according to the invention with product staple 200 g/m2 according to the prior art - Example 3

| | | | New product Example 3 140 g/m2 | Prior art Reinforced staple 200 g/m2 |
|---|---|---|---|---|
| Weight per surface unit | MD | g/m2 | 140 | 215 |
| | CD | g/m2 | 139 | 216 |
| Maximum load | MD | (N/5 cm) | 778 | 541 |
| | CD | (N/5 cm) | 492 | 386 |
| Specific load | MD | daN/5 cm/g/m2 | 0.56 | 0.25 |
| | CD | | 0.35 | 0.18 |
| | TOT | | 0.91 | 0.43 |
| Elongation at break | MD | % | 17 | 26 |
| | CD | % | 24 | 37 |
| Isotropy | | | 1.58 | 1.40 |

TABLE 4

Determination of the degree of homogeneity of the fibrous mixture.

| SPECIMEN NO. | Pi (g) | Pv (g) | Pr (g) | Pf (g) | (Pv − Pr)/Pf |
|---|---|---|---|---|---|
| Sample 1 | 1.725 | 0.745 | 0.403 | 1.190 | 0.287 |
| Sample 2 | 1.745 | 0.777 | 0.403 | 1.208 | 0.309 |
| Sample 3 | 1.760 | 0.744 | 0.403 | 1.221 | 0.279 |
| Sample 4 | 1.750 | 0.727 | 0.403 | 1.212 | 0.267 |
| Sample 5 | 1.837 | 0.813 | 0.403 | 1.291 | 0.318 |
| Average | 1.763 | 0.761 | — | 1.224 | 0.292 |
| Std. Deviation | 0.043 | 0.034 | — | 0.039 | 0.021 |

The invention claimed is:

1. A support substrate for roof covering waterproof bituminous membranes, wherein the substrate comprises at least two fiber layers arranged parallel above one another,
wherein each fiber layer comprises a homogeneous mix of organic and inorganic fibers oriented parallel to a longitudinal direction of the substrate,
wherein the mix comprises a weight percentage of organic fibers between 50% and 90% and the remainder is made of inorganic fibers,
wherein a reinforcing scrim with longitudinal glass threads and transversal polyester threads is interposed between and placed in direct contact with the at least two parallel fiber layers, and
wherein the fiber layers and the scrim are permeated with a consolidation organic fluid hydroentangling binder.

2. The substrate according to claim 1, wherein the mix comprises a weight percentage of organic fibers between 60% and 80% and the remainder being inorganic fibers.

3. The substrate according to claim 1, wherein the organic fiber is produced from spinnable polymers.

4. The substrate according to claim 1, wherein the substrate comprises between 5% and 15% by weight of the binder.

5. The substrate according to claim 1, wherein the organic fiber has a denier between 1.1 dtex and 17 dtex and a cutting length between 38 and 120 mm.

6. The substrate according to claim 1, wherein the inorganic fiber is glass fiber.

7. The substrate according to any claim 6, wherein the glass fiber has a denier between 1.1 dtex and 6.7 dtex and a cutting length between 25 and 80 mm.

8. The substrate according to claim 1, wherein the substrate has a breaking strength that is higher than 0.60 DaN/5 cm per g/m$^2$ for a weight per unit area of substrate equal to or higher than 100 g/m$^2$.

9. A method for producing a substrate (1) for a support for bituminous membranes according to claim 1, characterized in that it provides the mixing of organic (31) fibers and inorganic (32) fibers obtained through repeated opening and blending operations during the fiber preparation to the carding step, the combination of two or more fiber (3) layers obtained with said mixing dry-processed products by means of a card, the interposition between said layers of a reinforcing scrim (4), the consolidation of the substrate by means of high pressure water jets (hydroentangling), the drying and heat setting.

10. A method according to claim 9, characterized in that it provides a further consolidation step through the application of a binder.

11. A method according to claim 9, characterized in that during the hydroentangling step the substrate (1) is treated in one or more water jet beams, with a water pressure comprised between 50 and 350 Bar, preferably between 60 and 180 Bar.

12. A method according to claim 9, characterized in that the drying and heat setting is performed in a hot air furnace at a temperature comprised between 200 and 250° C., preferably between 220 and 240° C.

13. A method according to claim 9, characterized in that the heat setting is performed by means of calendering with rolls heated at a temperature between 190 and 250° C.

14. A method according to claim 9, characterized in that said inorganic fibers (32) are glass fibers.

15. The substrate according to claim 1, wherein the binder is acrylic, styrene-acrylic, styrene-butadiene, or vinyl, and is blended with natural binders that are derived from starches or vegetal cellulose.

16. The substrate according to claim 1, wherein the substrate comprises between 5% and 10% by weight of the binder.

17. The substrate according to claim 1, wherein the organic fiber has a denier between 2.8 dtex and 6.7 dtex and a cutting length between 50 and 100 mm.

18. The substrate according to claim 1, wherein the glass fiber has a denier between 1.7 dtex and 4.4 dtex and a cutting length between 30 and 50 mm.

19. The substrate according to claim 3, wherein the spinnable polymers are selected from the group consisting of polyamides, polyesters, and polymers with ether or ketone groups.

* * * * *